US009967257B2

United States Patent
Balmakhtar et al.

(10) Patent No.: US 9,967,257 B2
(45) Date of Patent: May 8, 2018

(54) SOFTWARE DEFINED NETWORK (SDN) APPLICATION INTEGRITY

(71) Applicant: Sprint Communications Company L.P., Overland Park, KS (US)

(72) Inventors: Marouane Balmakhtar, Alexandria, VA (US); Arun Rajagopal, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 248 days.

(21) Appl. No.: 15/071,484

(22) Filed: Mar. 16, 2016

(65) Prior Publication Data

US 2017/0272437 A1  Sep. 21, 2017

(51) Int. Cl.
*H04L 29/06* (2006.01)
*H04L 12/24* (2006.01)
*H04L 29/12* (2006.01)

(52) U.S. Cl.
CPC .............. *H04L 63/10* (2013.01); *H04L 41/00* (2013.01); *H04L 61/1511* (2013.01);
(Continued)

(58) Field of Classification Search
CPC ....... H04L 63/10; H04L 41/00; H04L 63/101; H04L 61/1511; H04L 63/0428; H04L 63/0236
See application file for complete search history.

(56) References Cited

U.S. PATENT DOCUMENTS

2013/0332983 A1   12/2013   Koorevaar et al.
2014/0075519 A1   3/2014    Porras et al.
(Continued)

FOREIGN PATENT DOCUMENTS

CN   104202303   12/2014
CN   104202322   12/2014
(Continued)

OTHER PUBLICATIONS

Christian Banse, et al.; "A Secure Northbound Interface for SDN Applications;" 2015 IEEE Trustcom/BigDataSE/ISPA; Aug. 20, 2015; pp. 834-839; IEEE.
(Continued)

*Primary Examiner* — Darren B Schwartz (57) ABSTRACT

A Software-Defined Network (SDN) authorizes Application Programming Interface (API) calls from user SDN applications to user SDN controllers. A user SDN application transfers an embedded code to an authorization SDN controller. The authorization SDN controller translates the embedded code into an SDN controller network address and an SDN application privilege data set. The authorization SDN controller transfers the SDN controller network address to the user SDN application. The authorization SDN controller transfers the SDN application privilege data set to the user SDN controller. The user SDN application transfers an SDN API call to the user SDN controller using the SDN controller network address. The user SDN controller determines if the SDN API call is authorized by the SDN application privilege data set. The user SDN controller services the API call if the SDN API call is authorized and inhibits an unauthorized API call.

20 Claims, 6 Drawing Sheets

(52) U.S. Cl.
CPC ...... *H04L 63/0236* (2013.01); *H04L 63/0428* (2013.01); *H04L 63/101* (2013.01)

(56) References Cited

U.S. PATENT DOCUMENTS

| | | |
|---|---|---|
| 2014/0229945 A1 | 8/2014 | Barkai et al. |
| 2014/0331280 A1 | 11/2014 | Porras et al. |
| 2014/0351801 A1* | 11/2014 | Shin .................. G06F 8/41 717/151 |
| 2014/0359697 A1 | 12/2014 | Ji |
| 2016/0241436 A1* | 8/2016 | Fourie ............... H04L 47/2425 |
| 2016/0254959 A1* | 9/2016 | Arndt ................. H04L 41/0816 370/235 |
| 2016/0308905 A1* | 10/2016 | Stiekes .................. H04L 47/20 |
| 2016/0330197 A1* | 11/2016 | Barillaud ............ H04L 63/0861 |
| 2016/0352731 A1* | 12/2016 | Mentze ............... H04L 12/6418 |
| 2017/0149843 A1* | 5/2017 | Amulothu ........... G06F 9/45558 |
| 2017/0161120 A1* | 6/2017 | Sasaki ................... G06F 9/541 |
| 2017/0222878 A1* | 8/2017 | Jacquin ............... H04W 76/025 |
| 2017/0244611 A1* | 8/2017 | Wang .................. H04L 41/5025 |

FOREIGN PATENT DOCUMENTS

| | | |
|---|---|---|
| CN | 104468633 | 3/2015 |
| WO | 0135565 | 5/2001 |
| WO | 2014128265 | 8/2014 |
| WO | 2015047451 | 4/2015 |
| WO | 2015047452 | 4/2015 |
| WO | 2015081766 | 6/2015 |

OTHER PUBLICATIONS

"Proposal for the 2nd revised text for draft Recommendation X.sdnsec-2: Security requirements and reference architecture for software-defined networking;" International Telecommunication Union; Feb. 2016; pp. 1-24; COM 17-C477-E; International Telecommunication Union.

\* cited by examiner

SOFTWARE DEFINED NETWORK (SDN) APPLICATION INTEGRITY

TECHNICAL BACKGROUND

Data communication systems exchange user data for user devices to provide various data communication services. The user devices may be phones, computers, media players, and the like. The data communication services might be media streaming, audio/video conferencing, data messaging, or internet access. Software-Defined Networks (SDNs) have become a popular data communication system to deliver these data communication services.

An SDN has applications, controllers, and data machines. The SDN controllers expose network-level control-plane Application Programming Interfaces (APIs) to the SDN applications. The SDN applications call these SDN controller APIs to implement the data communication services. In a like manner, the SDN data machines expose network-level data-plane APIs to the SDN controllers. The SDN controllers call these SDN data machine APIs to implement the data communication services. The SDN data machines process user data in response to the SDN data machine API calls.

For example, an SDN application may determine that an update to an SDN Flow Descriptor Table (FDT) is required to support a user data service. The SDN application calls a controller API with the FDT update. The SDN controller calls a data machine API with the FDT update. The SDN data machine updates its FDT responsive to the data machine API call from the SDN controller. Subsequently, the SDN data machine receives user data packets, matches the packet addresses to an action in the updated FDT, and performs the action on the user data packets. The SDN data machines may forward, drop, or store the user data packets based on the FDT.

Many SDNs run on Network Function Virtualization (NFV) computer systems. NFV computer systems have Virtual Network Functions (VNFs) that perform like typical communication network elements or portions of these network elements. The VNFs run under the control of hypervisors that control VNF access to NFV hardware (circuitry, memory, communication interfaces). To implement a data communication service, an NFV Management and Orchestration (MANO) system drives the NFV hardware to execute and support the VNFs based on NFV service descriptors for the data communication service. In NFV-SDN systems, the VNFs may be SDN applications, SDN controllers, and SDN virtual data machines.

Unfortunately, current SDN controllers are not efficiently and effectively configured to process API calls from SDN applications. In particular, SDN applications and controllers in an NFVI do not securely interact. SDN applications lack integrity in current SDN systems.

TECHNICAL OVERVIEW

A Software-Defined Network (SDN) authorizes Application Programming Interface (API) calls from user SDN applications to user SDN controllers. A user SDN application transfers an embedded code to an authorization SDN controller. The authorization SDN controller translates the embedded code into an SDN controller network address and an SDN application privilege data set. The authorization SDN controller transfers the SDN controller network address to the user SDN application. The authorization SDN controller transfers the SDN application privilege data set to the user SDN controller. The user SDN application transfers an SDN API call to the user SDN controller using the SDN controller network address. The user SDN controller determines if the SDN API call is authorized by the SDN application privilege data set. The user SDN controller services the API call if the SDN API call is authorized and inhibits an unauthorized API call.

TECHNICAL DESCRIPTION

Figure 1:
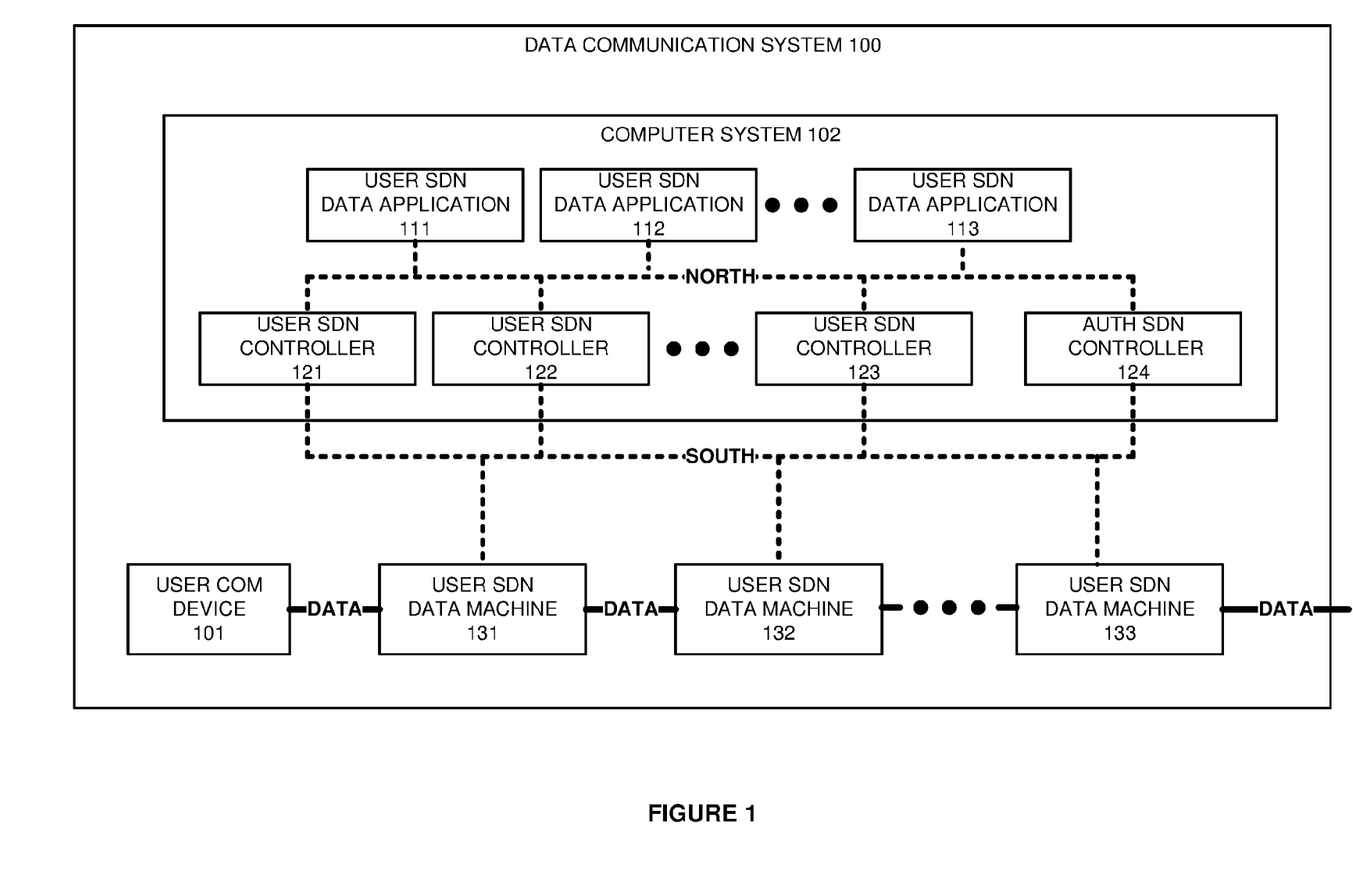
FIG. 1 illustrates a data communication system to maintain Software Defined Network (SDN) application integrity.

FIG. 1 illustrates data communication system 100 to maintain Software Defined Network (SDN) application integrity. Data communication system 100 exchanges user data for user communication device 101. User communication device 101 comprises a computer, phone, media player, or some other intelligent machine with a communication transceiver. The data exchange supports a data communication service such as media streaming, audio/video conferencing, messaging, internet access, or some other information service. Data communication network 100 comprises user communication device 101, computer system 102, and SDN data machines 131-133. Computer system 102 comprises user SDN applications 111-113, user SDN controllers 121-123, and authorization SDN controller 124.

SDN applications 111-113 are linked to SDN controllers 121-124 over a northbound SDN interface. SDN controllers 121-124 are linked to SDN data machines 131-133 over a southbound SDN interface. SDN data machine 131 is linked to user communication device 101. SDN data machine 132 is linked to SDN data machines 131 and 133. SDN data machine 133 is linked to an external system (not shown). Computer system 102 and SDN data machines 131-133 comprise data processing circuitry, data memory, operating software, and data communication interfaces. The northbound SDN interface uses processing circuitry and data memory under the control of operating software. The southbound SDN interface and the user data links use media such as air, metal, and/or glass, and may include intermediate data devices, systems, and networks. The SDN southbound interface uses protocols like Long Term Evolution (LTE), Wireless Fidelity (WiFi), Ethernet, Wave Division Multiplexing (WDM), Ethernet, Data over Cable System Interface Specification (DOCSIS), Internet Protocol (IP), and/or some other data communication format—including combinations thereof.

To deliver a data communication service, computer system 102 executes SDN applications 111-113 and SDN controllers 121-123. SDN applications 111-113 transfer SDN controller Application Programming Interface (API) calls to SDN controllers 121-123. SDN controllers 121-123 receive and process the SDN controller API calls to generate and transfer SDN data machine API calls. SDN controllers 121-123 transfer the SDN data machine API calls to SDN data machines 131-133. SDN data machines 131-133 receive and process the SDN data machine API calls to perform SDN actions on user data and also to transfer SDN data machine API responses. SDN controllers 121-123 receive the SDN data machine API responses. SDN controllers 121-123 process the SDN data machine API responses to generate and transfer SDN controller responses to SDN applications 111-113. Authorization SDN controller 124 supports the authorization of the SDN API calls from user SDN applications 111-113 to user SDN controllers 121-123.

User SDN applications 111-113 each have an authorization code embedded in their source code. The embedded authorization codes each include an SDN application identity and an SDN controller name. The embedded authorization code is usually encrypted. When computer system 102 initially runs SDN applications 111-113, they each receive default but restricted SDN privileges, and SDN controllers 121-123 would generally ignore their API calls. Using the default privileges, SDN applications 111-113 may transfer their embedded authorization codes to authorization SDN controller 124 over the SDN northbound interface.

Authorization SDN controller 124 translates the controller names from the embedded codes into SDN controller network addresses for SDN controllers 121-123. Authorization SDN controller 124 may comprise a Domain Name Service (DNS) server for the name-to-address translations. Authorization SDN controller 124 also translates the application identity and possibly the controller name from the embedded codes into individual SDN application privilege data sets.

The SDN application privilege data sets indicate rules for handling API calls for individual SDN applications 111-113. In some examples, the SDN application privilege data sets indicate rules for handling the API calls for individual SDN application/controller pairs or SDN groups. Authorization SDN controller 124 typically decrypts select data from the embedded codes, such as application IDs and controller names, and enters an authorization data structure with the decrypted data to yield the corresponding SDN application privilege data sets.

Authorization SDN controller 124 transfers the SDN controller network addresses to respective user SDN applications 111-113 over the SDN northbound interface. Authorization SDN controller 124 transfers the SDN application privilege data sets to respective user SDN controllers 121-123 over an SDN east/west interface. In this example, user SDN application 111 receives the user SDN controller network address for user SDN controller 121. User SDN controller 121 receives the SDN application privilege data set for user SDN application 111 from authorization SDN controller 124.

User SDN application 111 subsequently transfers an SDN API call over the SDN northbound interface to user SDN controller 121 using the network address. User SDN controller 121 responsively determines if the SDN API call from user SDN application 111 is authorized by the SDN application privilege data set for user SDN application 111. User SDN controller 121 services the API call if the SDN API call is authorized. For example, user SDN application 111 may use SDN API calls to establish a user data flow for UE 101 through SDN data machines 131-133. User SDN controller 121 inhibits an individual API call if the SDN API call is not authorized. The inhibition entails filtering the API call and blocking or only partially performing API actions for the API call.

For example, the SDN application privilege data set may indicate that user SDN application 111 has an API access privilege to user SDN controller 121 but not to user SDN controllers 122-123. Per their SDN application privilege data sets, user SDN controller 121 would service API calls from user SDN application 111, but user SDN controllers 122-123 would not service similar API calls.

The SDN application privilege data set may indicate that user SDN application 111 has a write privilege to user SDN data machines 131-132 but not to user SDN data machine 133. Per its SDN application privilege data, user SDN controller 121 would service API calls to write to user SDN data machines 131-132, but user SDN controller 121 would not service a similar API call to write to SDN data machine 133. Thus, user SDN application 111 could modify a Flow Descriptor Table (FDT) in user SDN data machines 131-132 but not in SDN data machine 133.

These API authorization operations would also apply to of user SDN applications 112-113. Note how SDN controllers 121-124 may use the SDN application privilege data sets to isolate SDN applications from other SDN controllers and from SDN data machines. SDN controllers 121-124 may also use the SDN application privilege data sets to federate SDN application to SDN controllers and to SDN data machines. Thus, the SDN application privilege data sets can be used to efficiently and effectively build and operate various Virtual Private SDNs (VPSDNs).

In some examples, user SDN applications 111-113 and controllers 121-123 are executed in a Network Function Virtualization Infrastructure (NFVI). User SDN applications 111-113 and controllers 121-123 then comprise Virtual Network Functions (VNFs) executing in the NFVI. Authorization SDN controller 124 is typically executed by an NFV Management and Orchestration (MANO) system.

Figure 2:
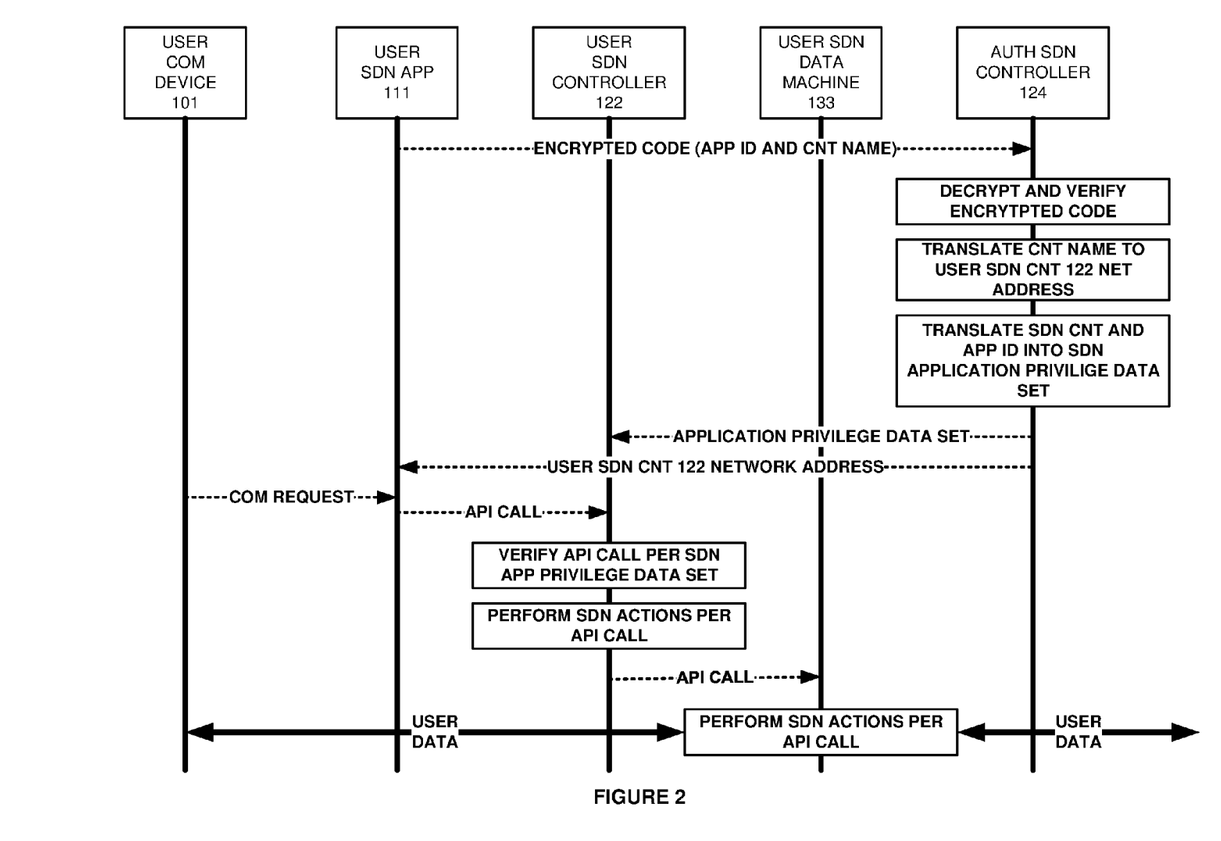
FIG. 2 illustrates the operation of the data communication system to maintain SDN application integrity.

FIG. 2 illustrates the operation of data communication system 100 to maintain SDN application integrity. User SDN application 111 transfers its embedded and encrypted authorization code having an SDN application ID and an SDN controller name. Authorization SDN controller 124 decrypts the embedded code and verifies the SDN application ID against a list of authorized SDN application IDs. Authorization SDN controller 124 translates the SDN controller name into an SDN controller network address—SDN controller 122 in this example.

Authorization SDN controller 124 then translates the SDN controller 122 ID and the SDN application 111 ID into an SDN application privilege data set. Thus, individual SDN application 111 may be managed on a per-controller basis. Authorization SDN controller 124 transfers the SDN application privilege data set to user SDN controller 122. Authorization SDN controller 124 also transfers the SDN controller 122 network address to user SDN application 111 over the SDN northbound interface.

User communication device 101 transfers a communication request to user SDN application 111. User SDN application 111 responsively transfers an SDN API call over the SDN northbound interface to user SDN controller 122. User SDN controller 122 responsively determines if the SDN API call from user SDN application 111 is authorized by the SDN application privilege data set that was transferred by authorization SDN controller 124 for user SDN application 111. User SDN controller 122 services the API call in this example because the API call is expressly authorized by the SDN application privilege data set. If the API call were unauthorized, then user SDN controller 122 would have inhibited the unauthorized API call.

User SDN controller 122 transfers a corresponding data machine API call to SDN data machine 133. SDN data machine 133 exchanges user data for user communication device 101 per the API call.

Figure 3:
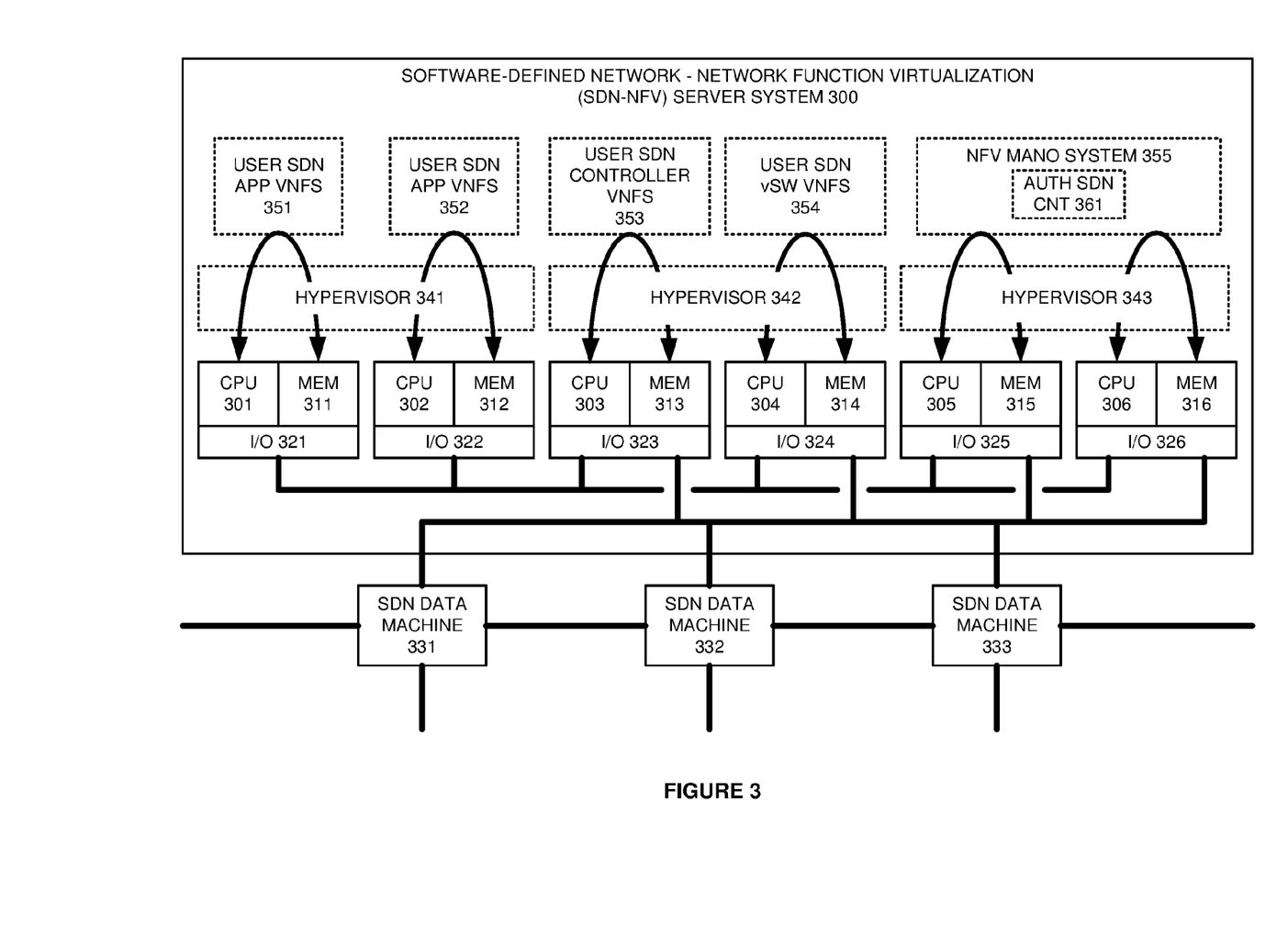
FIG. 3 illustrates an SDN-Network Function Virtualization (NFV) server system to maintain SDN application integrity.

FIG. 3 illustrates SDN-Network Function Virtualization (NFV) server system 300 to maintain SDN application integrity. SDN-NFV server system 300 is an example of data communication system 100, although system 100 may use alternative configurations and operations. SDN/NFV server system 300 comprises Central Processing Units (CPUs) 301-306, memories 311-316, and Input/Output (I/O) ports 321-326. I/O ports 323-326 are coupled to SDN data machines 331-333. The amount of CPUs, memory, I/O, and software components has been restricted for clarity.

SDN/NFV server system 300 includes hypervisors 341-343. User SDN application VNFs 351-352 traverse between CPUs 301-302 and memories 311-312 under the control of hypervisor 341. User SDN controller VNFs 353 and user SDN virtual Switch (vSW) VNFs 354 traverse between CPUs 303-304 and memories 313-314 under the control of hypervisor 342. Software and data for NFV MANO system 355 including authorization SDN controller 361 traverse between CPUs 305-306 and memories 315-316 under the control of hypervisor 343. MANO system 355 directs hypervisors 341-342 to retrieve VNFs 351-354 from memories 311-314 and to execute VNFs 351-354 on the appropriate CPUs 301-304. MANO system 355 also directs hypervisors 341-342 to control which memories 311-314 and I/O ports 321-325 are used by VNFs 351-354 and their data.

To deliver a data communication service, MANO system 355 processes an NFV service descriptor. The NFV service descriptor drives MANO system 353 to direct hypervisors 341-342 to execute and support SDN VNFs 351-354. Responsive to user data needs, user SDN application VNFs 351-352 transfer SDN controller API calls to SDN controller VNFs 353. SDN controller VNFs 353 process the SDN controller API calls to generate and transfer SDN data machine API calls to user SDN vSW VNFs 354 and/or SDN data machines 331-333. User SDN vSW VNFs 354 may also transfer SDN data machine API calls to SDN data machines 331-333.

SDN data machines 331-333 and SDN vSW VNFs 354 receive and process the SDN data machine API calls to perform SDN actions on user data and also to transfer SDN data machine API responses. SDN controller VNFs 353 receive the SDN data machine and vSW API responses. SDN controller VNFs 353 process the SDN data machine and vSW API responses to generate and transfer SDN controller responses to SDN application VNFs 351-352.

To maintain SDN application integrity, user SDN application VNFs 351-352 transfer their embedded and encrypted authorization codes to authorization SDN controller 361 when VNFs 351-352 are initialized. The embedded and encrypted authorization codes have SDN application IDs and SDN controller names. Authorization SDN controller 361 decrypts the embedded codes and verifies the SDN application IDs. Authorization SDN controller 361 translates the SDN controller names into an SDN controller network addresses for SDN controller VNFs 353.

Authorization SDN controller 361 then translates the individual SDN controller/application ID pairs into SDN application privilege data sets. Authorization SDN controller 361 transfers the SDN application privilege data sets to user SDN controller VNFs 353. Authorization SDN controller 361 also transfers the SDN controller network addresses to user SDN application VNFs 351-352 over the SDN northbound interface.

User SDN application VNFs 351-352 transfers SDN API calls over the SDN northbound interface to user SDN controllers VNFs 353. User SDN controllers VNFs 353 responsively determine if the individual SDN API calls from user SDN application VNFs 351-352 are authorized by the applicable SDN application privilege data sets. User SDN controller VNFs 353 service the API calls if authorized by the data sets. User SDN controller VNFs 353 transfers corresponding data machine API calls to SDN data machines 331-333 and/or SDN vSW VNFs 354. SDN vSW VNFs 354 may transfer corresponding data machine API calls to SDN data machines 331-333. SDN data machines 331-333 responsively exchange user data for services like video streaming, web browsing, data messaging, and the like.

Figure 4:
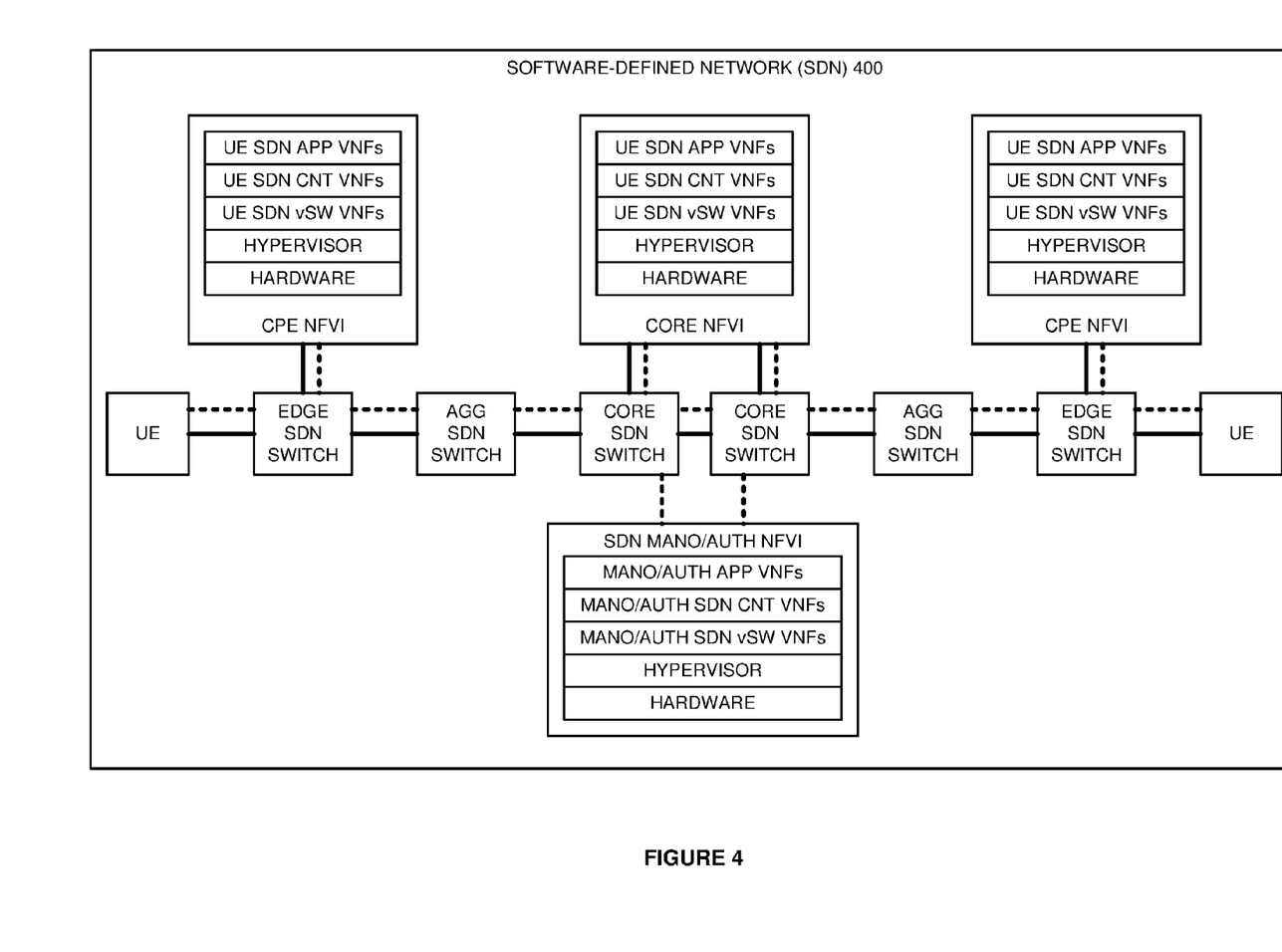
FIG. 4 illustrates an SDN to maintain SDN application integrity.

FIG. 4 illustrates SDN 400 to maintain SDN application integrity. SDN 400 is an example of data communication system 100, although system 100 may use alternative configurations and operations. SDN 400 comprises: User Equipment (UE), edge SDN switches, aggregation (AGG) SDN switches, core SDN switches, CPE NFVIs, a core NFVI, and a MANO/AUTH NFVI. The NFVIs comprise hardware such as CPU cores, flash memories, and I/O transceivers.

The NFVIs execute hypervisor software to provide a virtualized processing environment. Under the control of the MANO system, the hypervisors execute various SDN VNFs. In the NFVIs, the hypervisors execute UE SDN virtual switch (vSW) VNFs, UE SDN controller (CNT) VNFs, and UE SDN application (APP) VNFs. In the MANO/AUTH NFVI, the hypervisor executes MANO/AUTH SDN vSW VNFs, MANO/AUTH SDN CNT VNFs, MANO/AUTH SDN APP VNFs.

The MANO VNFs transfer networking data to the core NFVI hypervisors and the CPE NFVI hypervisors to drive the execution of the UE SDN VNFs. During initialization, user SDN application VNFs transfer their embedded and encrypted authorization codes to the authorization SDN application VNFs. The authorization SDN application VNFs decrypt the embedded codes and verify the user SDN application IDs. The authorization SDN application VNFs translate the SDN controller names into an SDN controller network addresses for the user SDN controller VNFs.

The authorization SDN application VNFs then translate the individual SDN controller/application ID pairs into SDN application privilege data sets. The authorization SDN application VNFs transfers the SDN application privilege data sets to the user SDN controller VNFs. The authorization SDN application VNFs also transfer the SDN controller network addresses to the user SDN application VNFs.

The user SDN application VNFs transfer SDN API calls to the user SDN controller VNFs using the SDN controller network addresses. The user SDN controller VNFs responsively determine if the individual SDN API calls from the user SDN application VNFs are authorized by the applicable SDN application privilege data sets. The user SDN controller VNFs service the API calls if authorized by the data sets, but the user SDN controller VNFs do not service unauthorized API calls. The user SDN controller VNFs transfer corresponding data machine API calls to the SDN data machines and/or the SDN vSW VNFs. The SDN data machines and/or the SDN vSW VNFs responsively exchange user data for services like video streaming, web browsing, data messaging, and the like.

Consider a data session between the UEs. One of the UEs transfers a session request to a CPE UE SDN application VNF. The CPE application VNF informs other CPE application VNFs, and one of the CPE application VNFs informs one of the core SDN application VNFs. In response, the core SDN application VNFs interact with the destination CPE application VNFs to extend the session.

The CPE and core application VNFs transfer SDN controller API calls for the UE session to their associated CPE and core controller VNFs. The CPE and controller VNFs authorize the controller API calls per their application privilege data sets and inhibit any unauthorized API calls. The CPE and controller VNFs transfer corresponding SDN data machine API calls to the virtual switches and data machines. API responses flow back to the controller VNFs and to the application VNFs. If needed, an SDN application VNF may direct an SDN controller VNF to drive an SDN data machine to deliver user data to an NFVI for heavier processing by the UE SDN vSW VNFs. For example, a given flow may be directed to a core SDN vSW VNF to perform transcoding, filtering, decryption, or the like.

In SDN 400, a given data communication service has an NFV service descriptor, forwarding graphs, and VNFs. The SDN application privilege data sets may indicate the applicable NFV service descriptors, forwarding graphs, and VNFs that are authorized for the user SDN application. An individual user SDN application can then be federated with or isolated from NFV service descriptors, forwarding graphs, or VNFs in this manner.

Figure 5:
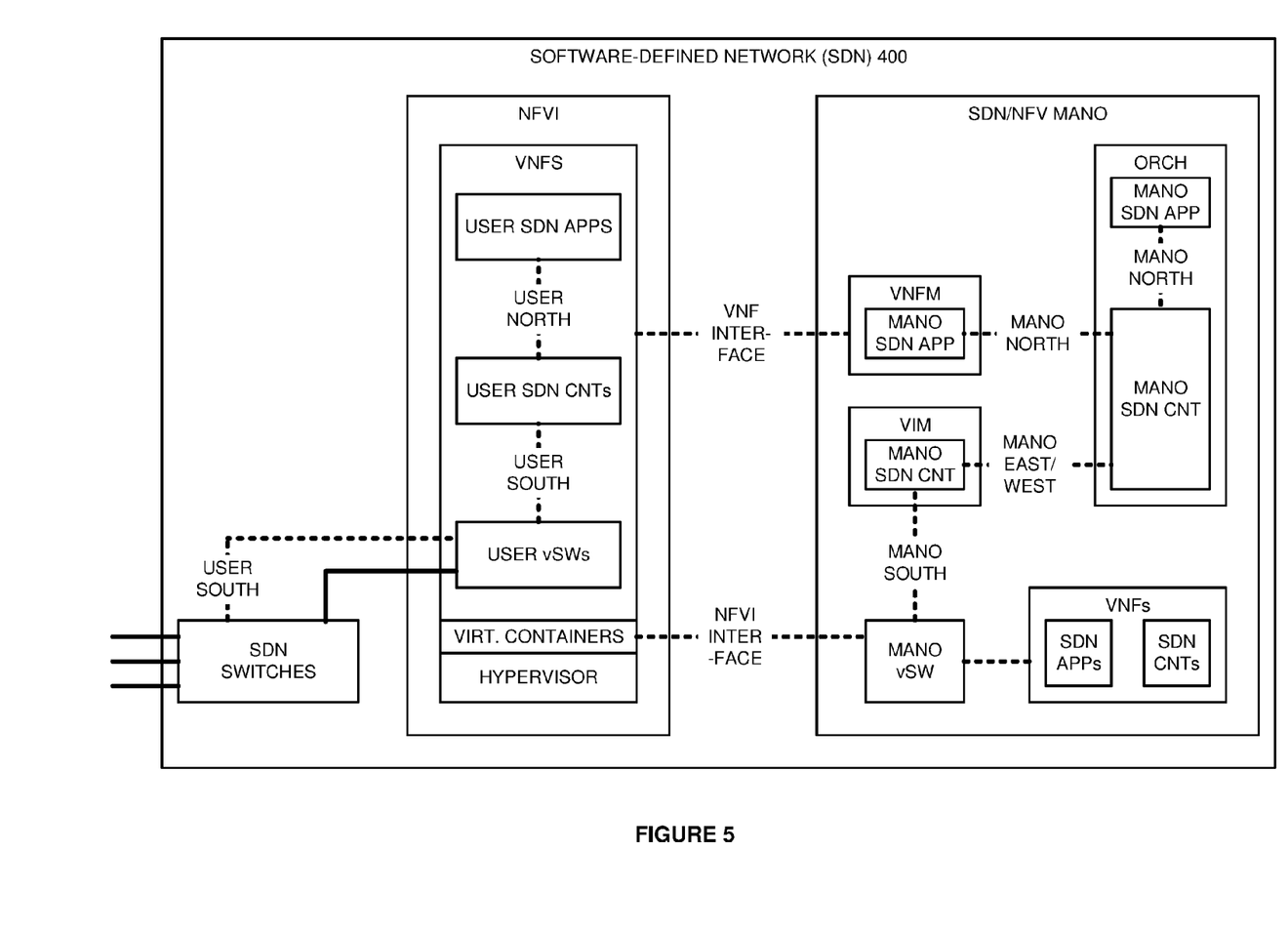
FIG. 5 further illustrates the SDN to maintain SDN application integrity.

FIG. 5 further illustrates SDN 400 to maintain SDN application integrity. The SDN/NFV MANO system is now shown with a VNF Manager (VNFM) that hosts a MANO SDN APP. The VNFM interacts with the executing NFVI VNFs over a VNF interface. The MANO system is also shown with a Virtual Infrastructure Manager (VIM) that hosts a MANO SDN CNT. The MANO system includes an Orchestrator (ORCH) that hosts a MANO SDN APP and a MANO SDN CNT.

The MANO SDN APPs and the MANO SDN CNT communicate over a MANO SDN northbound interface. The MANO SDN CNTs communicate over a MANO SDN east-west interface. The MANO SDN CNTs and the MANO SDN vSW communicate over a MANO SDN southbound interface. The MANO SDN CNTs transfer SDN APP VNFs and SDN CNT VNFs to the NFVI (on-boarding) over the NFVI interface by through the MANO vSW.

Under the control of the MANO system, the hypervisor virtual containers execute user SDN VNFs like vSW, CNT, and APP. The user SDN APP VNFs and the user SDN CNT VNFs communicate over a user SDN northbound interface. The user SDN CNT VNFs and user SDN vSW VNFs communicate over an SDN southbound interface. The user SDN vSW VNFs drive external SDN switches over a user southbound interface to deliver user data services.

During VNF on-boarding and initialization, the user SDN application VNFs transfer their embedded and encrypted authorization codes to the ORCH MANO SDN APP through the VNF interface, VNFM MANO SDN APP, and ORCH MANO SDN CNT. The MANO SDN APP decrypts the embedded codes and verifies the user SDN application IDs. The MANO SDN APP translates the SDN controller names into SDN controller network addresses for the user SDN controller VNFs.

The MANO SDN APP then translates the individual SDN controller/application ID pairs into SDN application privilege data sets. The MANO SDN APP transfers the SDN application privilege data sets to the user SDN controller VNFs over the VNF interface. The MANO SDN APP also transfers the SDN controller network addresses to the user SDN application VNFs over the VNF interface.

The user SDN application VNFs transfer SDN API calls to the user SDN controller VNFs using the SDN controller network addresses. The user SDN controller VNFs responsively determine if the individual SDN API calls from the user SDN application VNFs are authorized by the applicable SDN application privilege data sets. The user SDN controller VNFs service authorized API calls and block unauthorized API calls per the SDN application privilege data sets. The user SDN controller VNFs transfer corresponding data machine API calls to the SDN data machines and/or the SDN vSW VNFs. The SDN data machines and/or the SDN vSW VNFs responsively exchange user data for services like video streaming, web browsing, data messaging, and the like.

Figure 6:
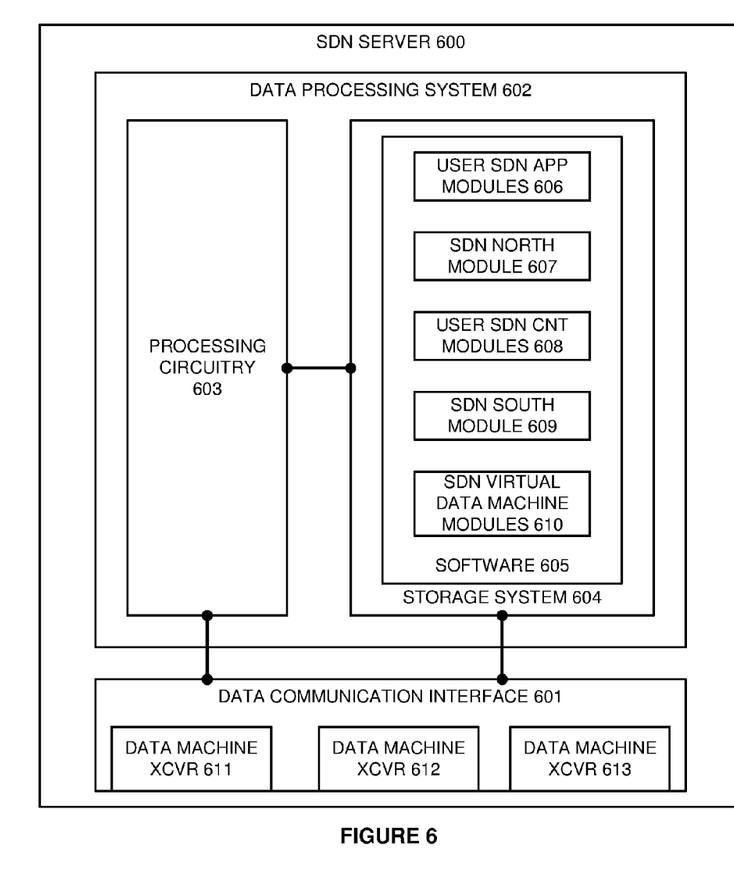
FIG. 6 illustrates an SDN server to maintain SDN application integrity.

FIG. 6 illustrates SDN server 600 to maintain SDN application integrity. SDN server 600 comprises data communication interface 601 and data processing system 602. Data communication interface 601 comprises data machine transceivers 611-616. Data processing system 602 comprises processing circuitry 603 and storage system 604. Storage system 604 stores software 605. Software 605 includes respective software modules 606-610.

Data machine transceivers 611-613 comprise communication components, such as ports, bus interfaces, signal processors, memory, software, and the like. Processing circuitry 603 comprises server blades, circuit boards, bus interfaces, integrated circuitry, and associated electronics. Storage system 604 comprises non-transitory, machine-readable, data storage media, such as flash drives, disc drives, memory circuitry, servers, and the like. Software 605 comprises machine-readable instructions that control the operation of processing circuitry 603 when executed. Software 605 includes software modules 606 and may also include operating systems, hypervisors, applications, data structures, virtual network elements, utilities, and the like. SDN server 600 may be centralized or distributed. All or portions of software 606-610 may be externally stored on one or more storage media, such as circuitry, discs, and the like. Some conventional aspects of SDN server 600 are omitted for clarity, such as power supplies, enclosures, and the like.

When executed by processing circuitry 603, software modules 606-610 direct circuitry 603 to perform the following operations. User SDN application modules 606 process user and network data to drive SDN controller modules 608 to initiate API authorization and to deliver data communication services to users. SDN north module 607 exchanges these SDN controller API calls and responses between SDN application modules 606 and SDN controller modules 608. SDN controller modules 608 process the SDN controller API calls to authorize the API calls per the application privilege data sets and to generate SDN data machine API calls to drive SDN vSW modules 610 and/or SDN data machines (not shown) to deliver data communication services to users. SDN south module 609 exchanges these SDN data machine API calls and responses between SDN controller modules 608 and the SDN data machines over data machine transceivers 611-613. SDN vSW modules 610 process user and southbound traffic based on data machine API calls from SDN controller modules 608.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a Software-Defined Network (SDN) to authorize an SDN Application Programming Interface (API) call from a user SDN application to a user SDN controller, the method comprising:
   one or more microprocessors executing the user SDN application, the user SDN controller, and the authorization SDN controller;
   the user SDN application transferring an embedded code to an authorization SDN controller over an SDN northbound interface;
   the authorization SDN controller translating the embedded code into an SDN controller network address and an SDN application privilege data set;
   the authorization SDN controller transferring the SDN controller network address to the user SDN application over the SDN northbound interface and transferring the SDN application privilege data set to the user SDN controller;
   the user SDN application transferring the SDN API call to the user SDN controller using the SDN controller network address over the SDN northbound interface; and
   the user SDN controller receiving the SDN API call, determining if the SDN API call is authorized by the SDN application privilege data set, servicing the API call if the SDN API call is authorized, and inhibiting the API call if the SDN API call is not authorized.

2. The method of claim 1 wherein the authorization SDN controller translating the embedded code into the SDN controller network address comprises an SDN Domain Name Service (DNS) server translating an SDN controller name into the SDN controller network address.

3. The method of claim 1 wherein:
   the user SDN application transferring the embedded code comprises the user SDN application transferring an encrypted version of the embedded code to the authorization SDN controller over the SDN northbound interface; and
   the authorization SDN controller translating the embedded code into the SDN application privilege data set comprises decrypting the encrypted version of the embedded code into the embedded code and entering an authorization data structure with the embedded code to yield the SDN application privilege data set.

4. The method of claim 1 wherein the user SDN controller determining if the SDN API call is authorized by the SDN application privilege data set comprises determining if the user SDN application has API access to the user SDN controller.

5. The method of claim 1 wherein the user SDN controller determining if the SDN API call is authorized by the SDN application privilege data set comprises determining if the user SDN application has a write privilege to a user SDN data machine.

6. The method of claim 1 wherein the user SDN controller determining if the SDN API call is authorized by the SDN application privilege data set comprises isolating the user SDN application from another SDN controller.

7. The method of claim 1 wherein the user SDN controller determining if the SDN API call is authorized by the SDN application privilege data set comprises isolating the user SDN application from a user SDN data machine.

8. The method of claim 1 wherein:
   the user SDN controller and the user SDN application are executed in a Network Function Virtualization Infrastructure (NFVI); and
   the authorization SDN controller is executed by a Network Function Virtualization Management and Orchestration (NFV MANO) system.

9. The method of claim 1 wherein the user SDN application comprises a Network Function Virtualization Virtual Network Function (NFV VNF).

10. The method of claim 1 wherein the user SDN controller comprises a Network Function Virtualization Virtual Network Function (NFV VNF).

11. A Software-Defined Network (SDN) to authorize an SDN Application Programming Interface (API) call from a user SDN application to a user SDN controller, the SDN comprising:
    the user SDN application configured to transfer an embedded code to an authorization SDN controller over an SDN northbound interface;
    the authorization SDN controller configured to translate the embedded code into an SDN controller network address and an SDN application privilege data set, transfer the SDN controller network address to the user SDN application over the SDN northbound interface, and transfer the SDN application privilege data set to the user SDN controller;
    the user SDN application configured to transfer the SDN API call to the user SDN controller using the SDN controller network address over the SDN northbound interface;
    the user SDN controller configured to receive the SDN API call, determine if the SDN API call is authorized by the SDN application privilege data set, service the API call if the SDN API call is authorized, and inhibit the API call if the SDN API call is not authorized; and
    one or more microprocessors configured to execute the user SDN application, the user SDN controller, and the authorization SDN controller.

12. The SDN of claim 11 wherein the authorization SDN controller is configured to translate the embedded code into the SDN controller network address with an SDN Domain Name Service (DNS) server.

13. The SDN of claim 11 wherein:
    the user SDN application is configured to transfer an encrypted version of the embedded code to the authorization SDN controller over the SDN northbound interface; and
    the authorization SDN controller is configured to decrypt the encrypted version of the embedded code into the embedded code and enter an authorization data structure with the embedded code to yield the SDN application privilege data set.

14. The SDN of claim 11 wherein the user SDN controller is configured to determine if the user SDN application has API access to the user SDN controller.

15. The SDN of claim 11 wherein the user SDN controller is configured to determine if the user SDN application has a write privilege to a user SDN data machine.

16. The SDN method of claim 11 wherein the user SDN controller is configured to isolate the user SDN application from another SDN controller.

17. The SDN of claim 11 wherein the user SDN controller is configured to isolate the user SDN application from a user SDN data machine.

18. The SDN of claim 11 wherein:
the computer system comprises a Network Function Virtualization Infrastructure (NFVI);
the authorization SDN controller is executed by a Network Function Virtualization Management and Orchestration (NFV MANO) system.

19. The SDN of claim 11 wherein the user SDN application comprises a Network Function Virtualization Virtual Network Function (NFV VNF).

20. The SDN of claim 11 wherein the user SDN controller comprises a Network Function Virtualization Virtual Network Function (NFV VNF).

* * * * *